US012571455B2

(12) United States Patent
    Hauck

(10) Patent No.:    US 12,571,455 B2
(45) Date of Patent:        Mar. 10, 2026

(54) TORQUE TRANSMISSION ASSEMBLY FOR A MOTOR VEHICLE

(71) Applicant: BorgWarner Inc., Auburn Hills, MI (US)

(72) Inventor: Hans Jurgen Hauck, Schwabisch Hall (DE)

(73) Assignee: BORGWARNER INC., Auburn Hills, MI (US)

( * ) Notice: Subject to any disclaimer, the term of this patent is extended or adjusted under 35 U.S.C. 154(b) by 79 days.

(21) Appl. No.: 18/521,766

(22) Filed: Nov. 28, 2023

(65)                Prior Publication Data

US 2024/0183430 A1        Jun. 6, 2024

(30)        Foreign Application Priority Data

Dec. 3, 2022    (DE) .......................... 102022004526.5

(51) Int. Cl.
    *F16H 3/00*         (2006.01)
    *F16D 13/38*        (2006.01)
    *F16D 25/10*        (2006.01)
    *F16H 57/02*        (2012.01)

(52) U.S. Cl.
    CPC ........... *F16H 3/006* (2013.01); *F16D 13/385* (2013.01); *F16D 25/10* (2013.01); *F16H 2057/02034* (2013.01); *F16H 2057/02043* (2013.01); *F16H 2200/0021* (2013.01)

(58) Field of Classification Search
    None
    See application file for complete search history.

(56)                References Cited

U.S. PATENT DOCUMENTS

| | | | |
|---|---|---|---|
| 8,322,503 B2* | 12/2012 | Combes ................. | B60K 6/387 |
| | | | 29/469 |
| 8,991,577 B2* | 3/2015 | Hauck ................. | F16D 25/0638 |
| | | | 192/48.609 |
| 9,003,925 B2* | 4/2015 | Corliss ................... | B60K 17/35 |
| | | | 74/661 |
| 11,415,208 B2 | 8/2022 | Engerman et al. | |
| 2005/0020398 A1 | 1/2005 | Tabata et al. | |
| 2017/0204940 A1* | 7/2017 | Tseng ................. | F16H 37/0813 |

FOREIGN PATENT DOCUMENTS

| | | | | |
|---|---|---|---|---|
| CN | 110748615 A | * | 2/2020 | |
| CN | 111322392 B | * | 9/2021 | ......... F16D 25/0638 |
| DE | 102020202786 A1 | | 10/2020 | |
| EP | 3219998 A1 | * | 9/2017 | ............. B60K 17/02 |

* cited by examiner

*Primary Examiner* — Bobby Rushing, Jr.

(74) *Attorney, Agent, or Firm* — Howard & Howard Attorneys PLLC

(57)                ABSTRACT

The present invention relates to a torque transmission assembly for a motor vehicle comprising a two-stage spur gear, having an input shaft for introducing the torque of a drive unit and an output shaft arranged parallel to the input shaft, and comprising a dual clutch following the spur gear in the torque flow for selectively transmitting the torque from a first and second stage of the spur gear to an output-side torque transmission member of the torque transmission assembly, wherein the dual clutch has a clutch output hub, on which the torque transmission member is arranged in a rotationally fixed manner, and the clutch output hub and the output shaft are supported against one another via at least one radial bearing.

23 Claims, 1 Drawing Sheet

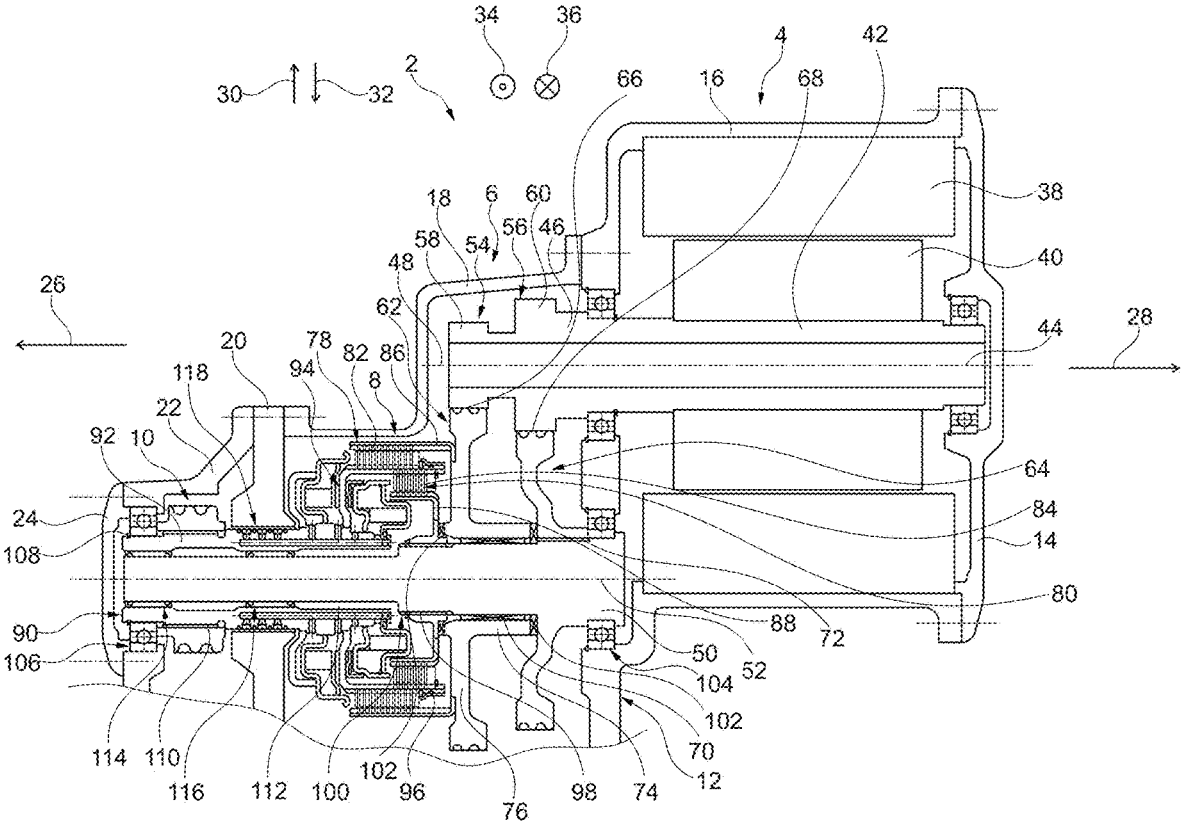

TORQUE TRANSMISSION ASSEMBLY FOR A MOTOR VEHICLE

CROSS-REFERENCE TO RELATED APPLICATIONS

This application claims priority pursuant to 35 U.S.C. 119(a) to German Application No. 102022004526.5, filed Dec. 3, 2022, which application is incorporated herein by reference in its entirety.

SUMMARY OF THE INVENTION

The present invention relates to a torque transmission assembly for a motor vehicle comprising a two-stage spur gear, having an input shaft for introducing the torque of a drive unit and an output shaft arranged parallel to the input shaft, and comprising a dual clutch for selectively transmitting the torque from a first and second stage of the spur gear to an output-side torque transmission member.

Torque transmission assemblies for motor vehicles with two-stage spur gears are known from practice, as are clutches for selectively transmitting torque from a first and second stage of the spur gear to an output-side torque transmission member, with the known torque transmission assemblies sometimes having a complex structure which requires a large amount of installation space and the forces acting on the torque transmission assemblies sometimes leading to undesirable movements of the components, such as wobbling, with the associated increased wear and ride disturbance.

i. It is therefore an object of the present invention to refine a torque transmission assembly of the type in question in such a way that, on the one hand, it has a compact and simple design and, on the other hand, it leads to very smooth running and low wear.

This object is achieved by the features specified in claim 1. Advantageous embodiments of the invention are the subject matter of the dependent claims.

The torque transmission assembly according to the invention is designed for use in the drive train of a motor vehicle. The torque transmission assembly therefore comprises a two-stage spur gear. Although a two-stage spur gear is mentioned here, it can also have three or more stages, meaning that the spur gear has at least two stages. Irrespective thereof, it is preferred if the spur gear actually only has two stages. The spur gear has an input shaft for introducing the torque of a drive unit, preferably an electric motor, and an output shaft arranged parallel to the input shaft, wherein at least or exclusively two stages are provided. Each stage is preferably made up of two gears or spur gears that are in rotary drive engagement with each other. Moreover, the torque transmission assembly comprises a dual clutch following the spur gear in the torque flow for selectively transmitting the torque from a first and second stage of the two-stage spur gear to an output-side torque transmission member of the torque transmission assembly. For instance, the dual clutch preferably has a first clutch, via which a torque flow can be selectively generated between the first stage of the spur gear and the torque transmission member, and a second clutch, via which a torque flow can be selectively generated between the second stage of the spur gear and the output-side torque transmission member. Moreover, the dual clutch is particularly preferably a concentric multi-disk dual clutch, the corresponding multi-disk assemblies of the first and second clutch being arranged nested with one another in the radial direction. The dual clutch has a clutch output hub on which the output-side torque transmission member is arranged in a rotationally fixed manner. The clutch output hub and the output shaft of the spur gear are supported against one another via at least one radial bearing. It is preferred in this case if at least two radial bearings are provided, via which the clutch output hub and the output shaft are supported against one another. The at least one radial bearing is preferably a rolling bearing, particularly preferably what is known as a needle roller bearing. It is also preferred if the clutch output hub and the output shaft are supported against one another via the at least one radial bearing while bypassing other components of the torque transmission assembly, and thus analogously directly via the at least one radial bearing. By supporting the clutch output hub and the output shaft of the spur gear against one another via at least one radial bearing, preferably via at least two radial bearings, the radial and axial forces introduced over/via the stages of the spur gear and the output-side torque transmission member can be supported and compensated for particularly reliably without the clutch output hub and the output shaft undergoing undesirable movements, for example wobble, whereby a relatively compact and simple design can also be achieved by supporting the clutch output hub and the output shaft against one another via the at least one radial bearing. This results in a torque transmission assembly with very smooth running, low wear, and a simple design.

In one advantageous embodiment of the torque transmission assembly according to the invention, the torque transmission assembly further comprises a fixed housing in which preferably the spur gear and the dual clutch, optionally also the output-side torque transmission member, or/and further components of a drive train of a motor vehicle are arranged. The fixed housing is preferably made up of a plurality of housing portions which are preferably releasably attached to each other.

In a preferred embodiment of the torque transmission assembly according to the invention, the clutch output hub is supported on the housing via a clutch-side fixed bearing. The fixed bearing can be a rolling bearing, for example. The clutch-side fixed bearing not only provides support for the clutch output hub on the housing in the radial direction, but also provides support in the opposite axial directions in order to prevent corresponding movements of the clutch output hub in the axial directions as far as possible.

In a particularly preferred embodiment of the torque transmission assembly according to the invention, the clutch-side fixed bearing is arranged nested in the radial direction with the at least one radial bearing in order to provide particularly secure support of the output shaft via the at least one radial bearing, the clutch output hub and the fixed bearing on the fixed housing, whereby any wobble movements of the output shaft can be prevented particularly efficiently. It is advantageous here if the clutch-side fixed bearing is arranged at least partially nested in the radial direction with the at least one radial bearing, however it is particularly preferred in this embodiment if the clutch-side fixed bearing is arranged fully nested in the radial direction with the at least one radial bearing in order to prevent undesirable movements of the output shaft and ensure that the latter is securely supported. Should two or more radial bearings be provided to support the clutch output hub and the output shaft against one another, the clutch-side fixed bearing is preferably arranged nested with the at least one of the radial bearings, optionally fully, in the radial direction, while the other radial bearing(s) can be arranged elsewhere between the clutch output hub and the output shaft.

In order to be able to absorb and support the forces acting on the torque transmission member, in particular due to any downstream transmission members, in a particularly secure manner, in a further advantageous embodiment of the torque transmission assembly according to the invention, the torque transmission member is supported on the clutch output hub in the mutually opposite axial directions. In order to make the design particularly compact and simple, the torque transmission member is supported on the clutch output hub in an axial direction via the clutch-side fixed bearing, with the support particularly preferably being provided directly on the clutch-side fixed bearing. Moreover, it is preferred in this embodiment if the torque transmission member is supported in the stated axial direction via the clutch-side fixed bearing on a retaining ring which serves to support the clutch-side fixed bearing in the corresponding axial direction on the clutch output hub, so that only one retaining ring is required here in order to support both the torque transmission member and the clutch-side fixed bearing on the clutch output hub via the retaining ring, wherein the clutch-side fixed bearing is arranged in this case between the torque transmission member and the retaining ring in order to provide indirect support for the torque transmission member via the clutch-side fixed bearing on the retaining ring. This embodiment thus provides a particularly compact and easily mountable design, which also enables the torque transmission member to be arranged particularly close to the clutch-side fixed bearing, so that the forces acting on the torque transmission member can be securely supported on the fixed housing in a particularly direct way via the clutch-side fixed bearing.

In order to make the support of the forces acting on the torque transmission assembly even more advantageous without the components or component parts thereof being prone to undesirable movements, in a further preferred embodiment of the torque transmission assembly according to the invention, a transmission-sides fixed bearing is also provided, via which the output shaft is supported on the housing. The transmission-side fixed bearing is preferably a rolling bearing. The transmission-side fixed bearing supports the output shaft not only in the radial direction on the housing but also in the mutually opposing axial directions in order to secure the output shaft as far as possible in the said axial directions. It is preferred in this embodiment if the first stage of the spur gears, the second stage of the spur gears and the dual clutch are arranged in the axial direction between the clutch-side fixed bearing and the transmission-side fixed bearing. It has moreover proved to be advantageous if the torque transmission member is also arranged in the axial direction between the clutch-side fixed bearing and the transmission-side fixed bearing in order to achieve a particularly compact and simple design.

According to a further advantageous embodiment of the torque transmission assembly according to the invention, the torque transmission member is arranged coaxially with the clutch output hub, preferably also coaxially with the output shaft, so that the torque transmission member and the clutch output hub, optionally also the output shaft, are rotatable In order to achieve a particularly simple assembly with an equally simple structure, in a further advantageous embodiment of the torque transmission assembly according to the invention, the torque transmission member is plugged onto the clutch output hub in the axial direction.

In order to be able to achieve the rotationally fixed arrangement of the torque transmission member on the clutch output hub in a particularly simple and fast manner, in a further advantageous embodiment of the torque transmission assembly according to the invention, the torque transmission member is arranged with a form-fit, preferably via a spline, on the clutch output hub.

According to a further advantageous embodiment of the torque transmission assembly according to the invention, the torque transmission member is formed by a gear. The gear wheel is preferably a helical gear wheel. Independent of the respective embodiment variant, a gear enables a particularly simple rotary drive engagement with downstream components of a drive train of the motor vehicle.

According to a particularly advantageous embodiment of the torque transmission assembly according to the invention, the torque transmission member is arranged nested with the at least one radial bearing between the clutch output hub and the output shaft in the radial direction in order to be able to safely support the forces acting on the torque transmission member within the torque transmission assembly. An at least partial overlap of the torque transmission member and the radial bearing in an axial region, i.e. an arrangement that is at least partially nested in the radial direction, has already proven to be advantageous here. For instance, the torque transmission member could preferably be arranged nested in the radial direction with that radial bearing with which the clutch-side fixed bearing is already arranged nested in the radial direction in order to ensure a particularly compact design and also secure support of the forces acting on it.

In a particularly advantageous embodiment of the torque transmission assembly according to the invention, the clutch output hub has an opening to receive the output shaft, so that the output shaft can extend into the opening in a space-saving manner. The opening is preferably a continuous opening in the axial direction within the clutch output hub, in particular to ensure easy access. In this embodiment it is also preferred if the at least one radial bearing for supporting the clutch output hub and output shaft against one another is arranged in the said opening of the clutch output hub. In the case of two or more radial bearings, it is advantageous if all radial bearings are arranged inside the opening of the clutch output hub. As this embodiment also therefore results in a radial nesting of the clutch output hub and output shaft, a particularly secure alignment and arrangement of the said components in relation to each other is ensured.

In a further preferred embodiment of the torque transmission assembly according to the invention, the dual clutch is a wet-running or/and hydraulically actuatable dual clutch. It is preferred here if a rotary feedthrough is formed between a fixed housing portion and the clutch output hub, via which the dual clutch in the form of a wet-running dual clutch can be supplied with a cooling or/and lubricating fluid or/and the dual clutch in the form of a hydraulically actuatable dual clutch can be supplied with a hydraulic fluid. It is preferred here if the said rotary feedthrough is formed in the radial direction between the fixed housing portion on the one hand and the clutch output hub on the other hand. It is also preferred if the fixed housing portion in one piece or/and is in the form of a wall in radial direction or/and is releasably attached to other housing portions of the housing. In order to ensure the supply of a cooling or/and lubricating fluid via the rotary feedthrough, at least one cooling or/and lubricating fluid channel is preferably formed in the housing portion, which is fluidically connected via the rotary feedthrough with a cooling or/and lubricating fluid channel in the clutch output hub. Alternatively or in addition, at least one hydraulic fluid channel is preferably formed in the housing portion, which is fluidically connected via the rotary feedthrough with at least one hydraulic fluid channel in the clutch output hub.

In a further particularly advantageous embodiment of the torque transmission assembly according to the invention, the rotary feedthrough is arranged nested in the radial direction with the at least one radial bearing, via which the clutch output hub and the output shaft are supported against one another. This ensures a particularly high degree of tightness of the rotary feedthrough when transferring the cooling or/and lubricating fluid or/and the hydraulic fluid from the housing portion to the clutch output hub, especially as a wobble or other undesirable movement of the clutch output hub relative to the fixed housing portion in the region of the rotary feedthrough can be largely prevented. Should two or more radial bearings be arranged between the clutch output hub and output shaft in this embodiment, at least the radial nesting with one of the radial bearings is preferred.

In a further particularly preferred embodiment of the torque transmission assembly according to the invention, at least two radial bearings are provided to support the clutch output hub and the output shaft against one another, wherein a first radial bearing is provided, which is arranged nested with the clutch-side fixed bearing or/and the torque transmission member in the radial direction, and a second radial bearing is provided, which is arranged nested with the rotary feedthrough in the radial direction.

According to a further advantageous embodiment of the torque transmission assembly according to the invention, the rotary feedthrough or/and housing portion associated with the rotary feedthrough is arranged in the axial direction between the torque transmission member on the one hand and the components of the dual clutch to be supplied with the cooling or/and lubricating fluid or/and the hydraulic fluid on the other hand. It is preferred in this case if the said housing portion delimits a wet chamber of the wet-running dual clutch with respect to a chamber for accommodating the torque transmission member, wherein the housing portion preferably is preferably in the form of a wall and extends in the radial direction. Here the chamber accommodating the torque transmission member does not necessarily have to be in the form of a dry chamber, however the fixed housing portion provides at least partial or complete delimitation of the wet chamber for the dual clutch, in order to ensure reliable cooling or/and lubrication of the latter.

In a further particularly advantageous embodiment of the torque transmission assembly according to the invention, the first stage of the spur gear has a first output gear which is mounted rotatably on the output shaft and is connected to a first input side of a first clutch of the dual clutch in a rotationally fixed manner, and the second stage of the spur gear has a second output gear which is arranged rotationally fixed on or to the output shaft and is in rotary drive connection with a second input side of a second clutch of the dual clutch via the output shaft. The rotationally fixed connection between the first input side of the first clutch and the first output gear that is rotatably mounted on the output shaft results in a particularly compact and simple design, especially as there is no need for a second output shaft, which would be connected with the first output gear in a rotationally fixed manner and via which the first input side would be indirectly in rotary drive connection with the first output gear. This not only eliminates the need for such an additional output shaft that is connected in a rotationally fixed manner with the first output gear, but the first input side can also interact more directly or over a shorter distance with the first stage of the spur gear.

According to a further particularly preferred embodiment of the torque transmission assembly according to the invention, the first input side is connected in a rotationally fixed manner to the first output gear spaced apart in the radial direction from a wheel hub of the first output gear, in order to achieve a rotationally fixed connection over the shortest possible distance and to create an installation-space-saving first input side. If the first input side, for example, is formed by a multi-disk carrier, this can be substantially reduced to the tubular disk carrier portion, while it is supported in the radial direction via the first output gear.

According to a further advantageous embodiment of the torque transmission assembly according to the invention, the first input side is directly connected in a rotationally fixed manner to the first output gear, in order to achieve a particularly simple and compact design and to transmit torque over the shortest possible distance.

In a further advantageous embodiment of the torque transmission assembly according to the invention, the second input side is in rotary drive connection, optionally directly or/and releasably, with the output shaft, wherein this is particularly preferably done via a toothing engagement.

In order to further simplify the design and assembly, the second input side, the first output gear and the second output gear are supported in a further preferred embodiment of the torque transmission assembly according to the invention via a common retaining ring in an axial direction on the output shaft. In principle, the second input side, the first output gear and the second output gear can be supported directly against one another but it is preferred if this is done with the interposition of axial bearings. Alternatively or in addition, the second input side, the first output gear and the second output gear, are supported on the output shaft or/and the fixed housing in the opposite axial direction via the transmission-side fixed bearing, optionally again with the interposition of axial bearings, the already existing support of the transmission-side fixed bearings in the said opposite axial direction can also be used here jointly by the said components, which simplifies the design further.

As already indicated above, the output gear can have a wheel hub, via which the output gear is preferably rotatably mounted on the output shaft, preferably with the interposition of a radial bearing. In a further advantageous embodiment of the torque transmission assembly according to the invention, the wheel hub of the first output gear is tubular, wherein the tubular wheel hub substantially extends in the axial direction, so that the output shaft can preferably extend through the wheel hub of the first output gear. Due to the tubular wheel hub, a wobbling movement of the first output gear relative to the output shaft is largely prevented. In this embodiment it is moreover preferred if the first output gear also has a radial portion extending substantially in the radial direction, wherein the first input side of the first clutch of the dual clutch is connected in a rotationally fixed manner to this radial portion extending in the radial direction, wherein the connection is preferably done preferably directly on the radial portion. Moreover it is preferred if an external toothing or/and helical toothing is provided on the radial portion, as is generally used for spur gears in a spur gear transmission. By attaching the first input side in a rotationally fixed manner to the radial portion of the output gear, but not directly in a rotationally fixed manner on the wheel hub of the first output gear or connecting it in a rotationally fixed manner to the latter, a particularly simple and small first input side is created, which moreover—without an additional radial portion—can be or is supported on the output shaft via the radial portion of the first output gear and its wheel hub in the radial direction.

In a further advantageous embodiment of the parking lock according to the invention, the multiple disk clutch is designed as a concentric dual multiple disk clutch with an inner clutch and an outer clutch. In the case of a concentric dual clutch, the first and second clutch of the dual clutch are arranged nested in the radial direction. In the case of a dual clutch in the form of a multi-disk dual clutch, the first and second clutch of the dual clutch each have a multi-disk pack consisting of outer and inner disks. Consequently, in a concentric multi-disk dual clutch, the two multi-disk packs of the first and second clutch of the dual clutch are arranged nested in the radial direction.

In a further preferred embodiment of the torque transmission assembly according to the invention, the first clutch of the dual clutch is designed as a radially outer multi-disk clutch with the first input side in the form of an outer multi-disk carrier and the second clutch is designed as a radially inner multi-disk clutch with the second input side in the form of an inner multi-disk carrier. Because the first input side is in the form of an outer multi-disk carrier, the first input side can, for example, be attached on the first output gear in a rotationally fixed manner particularly far away from the wheel hub of the first output gear in order to transmit a torque over the shortest possible distance. The same applies to the second input side in the form of an inner multi-disk carrier, which can be very compact, especially as the inner multi-disk carrier of the inner multi-disk clutch is already arranged relatively close to the output shaft.

According to a further particularly advantageous embodiment of the torque transmission assembly according to the invention, a multi-disk carrier connected to the clutch output hub in a rotationally fixed manner is provided to form the output side of the outer and inner multi-disk clutch. The multi-disk carrier forming the output side of both the outer and the inner multi-disk clutch preferably has a tubular disk carrier portion with an outer rotary drive contour for inner disks of the outer multi-disk clutch and an inner rotary drive contour, arranged nested with the outer rotary drive contour in the radial direction, for outer disks of the inner multi-disk clutch. The tubular disk carrier portion is preferably designed as a single or/and one-piece disk carrier portion in order to achieve a particularly compact design. Because of the radial nesting of the outer rotary drive contour and the inner rotary drive contour, the multi-disk packs of the outer and inner multi-disk clutch can likewise be arranged nested in the radial direction, without the need for a further tubular disk carrier portion for the multi-disk carrier forming the output side in addition to the, optionally single or/and one-piece tubular disk carrier portion. The tubular disk carrier portion is preferably designed as a one-piece sheet metal part, wherein the inner or outer rotary drive contour was also produced by forming the inner or outer rotary drive contour.

In a further advantageous embodiment of the torque transmission assembly according to the invention, a drive unit is also provided with an output drive shaft, which is in direct or indirect the rotary drive connection with the input shaft of the spur gear. Consequently, the torque transmission assembly in this embodiment can also be referred to as a drive assembly for a motor vehicle. In order to achieve a particularly compact design in this embodiment as well, the output drive shaft of the drive unit is preferably designed in one piece with the input shaft of the spur gear.

According to a further particularly advantageous embodiment of the torque transmission assembly according to the invention, the drive unit is formed by an electric motor or an electric machine which can be operated both as a generator and as a motor. The electric motor or the electric machine preferably has a rotor connected in a rotationally fixed manner or/and directly to the output drive shaft, wherein the rotor is particularly preferably surrounded by a stator of the electric motor or the electric machine in the radial direction on the outside.

BRIEF DESCRIPTION OF THE DRAWING(S)

The invention is explained in more detail below using an exemplary embodiment with reference to the single FIGURE. The single FIGURE shows a side view of an embodiment of the torque transmission assembly according to the invention in sectional illustration.

DETAILED DESCRIPTION

The FIGURE shows a torque transmission assembly 2 for a motor vehicle or the drive train of a motor vehicle. The torque transmission assembly 2 is substantially made up of a drive unit 4, a two-stage spur gear 6, a dual clutch 8 and a output-side torque transmission member 10, which are arranged one after the other starting from the the drive unit 4 in the said sequence in the torque flow starting from the drive unit 4. Moreover, the said components are arranged within a fixed housing 12, which in the embodiment shown is substantially formed by the housing portions 14, 16, 18, 20, 22, 24 which are preferably each formed in one piece or/and releasably attached to one another. The mutually opposing axial directions 26, 28, the mutually opposing radial directions 30, 32 and the mutually opposing circumferential directions 34, 36 are indicated in the FIGURE by corresponding arrows.

The drive unit 4 is formed by an electric motor. To more precise, the drive unit 4 is formed by an electric machine which can be operated both as a motor and as a generator. In this case, the drive unit 4, which is substantially arranged within the housing portions 14, 16, has a stator 38 fixed to the housing and a rotor 40 arranged in the radial direction 32 within the annular stator 38. The rotor 40 is connected in a rotationally fixed manner to an output drive shaft 42 of the drive unit 4 which is rotatable about a rotation axis 44 extending in the axial directions 26, 28. The rotor 40 is also directly connected to the output drive shaft 42 in a rotationally fixed manner.

The output drive shaft 42 of the drive unit 4 is in rotary drive connection with an input shaft 46 of the spur gear 6 in the axial direction 26, wherein the rotary drive connection between the output drive shaft 42 and the input shaft 46 can be direct or indirect. In the embodiment illustrated, the output drive shaft 42 of the drive unit 4 is designed in one piece with the input shaft 46 of the spur gear 6, in order to be directly connected to the input shaft 46 in a rotationally fixed manner, whereby a rotation axis 48 the input shaft 46 consequently coincides with the rotation axis 44 of the output drive shaft 42 and likewise extends in the axial directions 26, 28. The output drive shaft 42 designed in one piece with the input shaft 46 extends in the axial direction 26 through an opening in the housing portion 16 into a chamber which is substantially surrounded by the housing portions 16, 18 and 20.

The spur gear 6 is arranged in this chamber. In addition to the aforementioned input shaft 46 for introducing the torque of the drive unit 4, the spur gear 6 has an output shaft 50 which is arranged parallel to the input shaft 46 and is rotatable about a rotation axis 52, wherein the rotation axis 52 in turn extends in the axial directions 26, 28 and is arranged parallel to the rotation axis 48 and thereby offset in the radial direction 32 or 30 with respect to the rotation axis 48. The spur gear 6 has two gear stages or stages, namely a first stage 54 and a second stage 56. Both stages 54, 56 each have an externally toothed or/and helically toothed input gear 58, 60 which is connected to the input shaft 46 in a rotationally fixed manner. Moreover, the first stage 54 has a first output gear 62 which is indirectly or directly, here directly, in rotary drive engagement with the input gear 58. The second stage 56 has a second output gear 64 which is indirectly or directly, here directly, in rotary drive engagement with the input gear 60. For this purpose, both output gears 62, 64 each have an external toothing 66, 68, which is preferably designed as a helical toothing. Both output gears 62, 64 are furthermore arranged on the output shaft 50 and can rotate about the latter or with the latter about the rotation axis 52, wherein the first output gear 62 is arranged behind the second output gear 64 in the axial direction 26 and thus follows the second output gear 64 in the said axial direction 26.

The first output gear 62 of the first stage 54 is rotatably mounted on the output shaft 50 by means of a bearing 70. The second output gear 64 of the second stage 56 on the other hand is arranged rotationally fixed on or to the output shaft 50, wherein the rotationally fixed arrangement is achieved here by a positive fit, specifically by a toothing or spline 72. Therefore, the second output gear 64 rotates together with the output shaft 50 about the rotation axis 52.

In the embodiment illustrated, the first output gear 62 is designed in one piece and is made up substantially of a tubular wheel hub 74, which extends substantially in the axial direction 26, 28, so that the output shaft 50 can be guided through the wheel hub 74 in the axial direction 26, as shown in the FIGURE, and of a radial portion 76 which extends outwards from the tubular wheel hub 74 in the radial direction 30, on the side of which pointing outwards in the radial direction 30 the aforementioned external toothing 66 is provided in the form of a helical toothing. The bearing 70 is arranged in the radial direction 30, 32 between the inner output shaft 50 and the tubular wheel hub 74.

The dual clutch 8 is arranged substantially in the axial direction 26 next to the first output gear 62 and within the chamber delimited by the housing portions 16, 18 and 20. The dual clutch 8 is used to selectively transmit the torque from the first stage 54 and the second stage 56 of the spur gear 6 to the output-side torque transmission member 10. The dual clutch 8 is a hydraulically actuatable dual clutch 8. In addition, the dual clutch 8 is a wet-running dual clutch 8, so that it rotates in a cooling or/and lubricating fluid. To be more precise, the dual clutch 8 is a dual-disk clutch, the disks of which are arranged inside the cooling or/and lubricating fluid, i.e. in a wet chamber.

The dual clutch 8 has a first clutch 78 and a second clutch 80 which are consequently each designed as multi-disk clutches with a multi-disk pack 82 or 84 respectively. The dual clutch 8 is also a concentric dual clutch 8, wherein the first clutch 78 is a radially outer multi-disk clutch and the second clutch 80 is a radially inner multi-disk clutch. Because this is a concentric dual clutch 8, the multi-disk packs 82, 84 are arranged nested in the radial direction 30, 32, so that the multi-disk pack 82 surrounds the multi-disk pack 84 in the radial direction 30 on the outside, wherein this does not necessarily have to be the case entirely, as is shown in the FIGURE, in which the two multi-disk packs 82, 84 have only a partial axial region of overlap.

The first clutch 78 has a first input side 86 in the form of an outer multi-disk carrier, while the second clutch 80 has a second input side 88 in the form of an inner multi-disk carrier. The output side 90 of both the first clutch 78 and the second clutch 80 is substantially formed by a clutch output hub 92 on which a further multi-disk carrier 94 is attached in a rotationally fixed manner. The multi-disk carrier 94 forming a portion of the output side 90 has a tubular disk carrier portion 96 which extends in the axial direction 28 between the multi-disk packs 82, 84 of the two clutches 78, 80 arranged nested in the radial direction 30, 32. The disk carrier portion 96 has an outer rotary drive contour, pointing outward in the radial direction 30, for inner disks of the first clutch 78 in the form of the outer multi-disk clutch and an inner rotary drive contour, pointing inward in the radial direction 32 and arranged nested with the outer rotary drive contour in the radial direction 30, 32, for outer disks of the second clutch 80 in the form of the inner multi-disk clutch. In this case, the disk carrier portion 96 is preferably designed as single or/and one-piece disk carrier portion 96 in order to form a common disk carrier portion 96 for both the first and the second clutches 78, 80. It is preferred here if the multi-disk carrier 94 or, optionally, only the disk carrier portion 96 is a sheet-metal part in which the generation of the outer or inner rotary drive contour likewise brings about the generation of the inner or outer rotary drive contour, resulting in a multi-disk carrier 94 or disk carrier portion 96 which is particularly easy to manufacture and moreover ensures a space-saving arrangement of the two multi-disk packs 82, 84 relative to one another.

The second input side 88 in the form of the inner multi-disk carrier is arranged on axial side of the first output gear 62 facing away from the second output gear 64, i.e. next to the first output gear 62 in the axial direction 26. Irrespective of this, the second input side 88 is in rotary drive connection with the second output gear 64 via the output shaft 50 which extends through the tubular wheel hub 74 of the first output gear 62, wherein, for this purpose, the inner multi-disk carrier forming the second input side 88 is positively attached in a rotationally fixed manner to the output shaft 50, here by means of a toothing 98. Consequently, in the embodiment illustrated, the second input side 88 is indirectly in rotary drive connection with the output shaft 50.

The first input side 86 in the form of the outer multi-disk carrier is, by contrast, connected to the first output gear 62 in a rotationally fixed manner. In this case, however, the first input side 86 in the form of the outer multi-disk carrier is connected in a rotationally fixed manner or attached not to the wheel hub 74 of the first output gear 62, but rather to the first output gear 62 in the radial direction 30 outwardly spaced apart from the wheel hub 74 of the first output gear 62, more precisely on the radial portion 76 of the first output gear 62, on which the aforementioned external toothing 66 in the form of the helical toothing is provided on the outside in the radial direction 30. In this case, the outer multi-disk carrier forming the first input side 86 is attached in a rotationally fixed manner to the first output gear 62 or the radial portion 76 of the first output gear 62. As evident from the FIGURE, the outer multi-disk carrier forming the first input side 86 can thus be substantially reduced to a tubular disk carrier portion for the outer disks of the multi-disk pack 82, while the support of the thus reduced outer multi-disk carrier in the radial direction 30, 32 can be provided via the radial portion 76, the wheel hub 74 and the bearing 70 on the output shaft 50, resulting in a significantly more simple and compact design, which dispenses with an additional radial support portion on the outer multi-disk carrier. Moreover, the path for transmitting the torque between the first stage 54 or the first output gear 62 and the outer multi-disk carrier forming the first input side 86 is significantly shorter.

As evident from the FIGURE, the second output gear 64, the first output gear 62 and the second input side 88 in the form of the inner multi-disk carrier are arranged on the an the output shaft 50 one after the other in the axial direction 26. In order to support the said components in the axial direction 26 on the output shaft 50, a common retaining ring 100 is arranged on the output shaft 50, on which the second input side 88 in the form of the inner multi-disk carrier can be or is supported in the axial direction 26, while the first output gear 62 can be or is supported indirectly on the common retaining ring 100 via the second input side 88 and the second output gear 64 via the first output gear 62 and the second input side 88. In this case, the said components can be supported against one another indirectly, however it is preferred if an axial bearing 102, preferably an axial needle roller bearing, is arranged between the first output gear 62 and the second input side 88 or/and between the second output gear 64 and the first output gear 62.

In the opposite axial direction 28, however, the second input side 88, the first output gear 62 and the second output gear 64 are supported on the output shaft 50 or/and the housing 12 via a transmission-side fixed bearing 104, with the transmission-side fixed bearing 104 which is preferably designed as a rolling bearing being discussed again in more detail later on.

The clutch output hub 92 extends starting from the multi-disk carrier 94 in the axial direction 26 through an opening in the housing portion 20 into a chamber which is substantially surrounded by the housing portion 20 and the housing portions 22 and 24. The torque transmission member 10 which is arranged on the clutch output hub 92 in a rotationally fixed manner is also provided in this chamber. The clutch output hub 92 is supported on the housing 12, to be more precise on the two housing portions 22, 24 of the housing 12 via a clutch-side fixed bearing 106, which—as shown in the FIGURE—is preferably designed as a rolling bearing. This clutch-side fixed bearing 106 is arranged in the axial direction 26 next to the torque transmission member 10, i.e. on the side of the torque transmission member 10 facing away from the dual clutch 8. In this case, the clutch-side fixed bearing 106 is supported indirectly on the clutch output hub 92 via a retaining ring 108 in the axial direction 26. Moreover, the clutch-side fixed bearing 106 is supported in both axial directions 26, 28 on the housing 12, to be more precise in the axial direction 6 on the housing portion 24 and in the axial direction 28 on the housing portion 22.

The torque transmission member 10 is arranged coaxially with the clutch output hub 92, so that the latter can rotate together with the clutch output hub 92 about the rotation axis 52. The torque transmission member 10, which in the embodiment illustrated is designed as a helically toothed or/and externally toothed gear, is plugged onto the clutch output hub 92 in the axial direction 28 to achieve a form-fit, rotationally fixed connection with the clutch output hub 92, wherein for this purpose, a spline 110 is preferably formed between the torque transmission member 10 and the clutch output hub 92.

The torque transmission member 10 is supported on the clutch output hub 92 in the mutually opposite axial directions 26, 28. In the axial direction 26, the support is provided via the clutch-side fixed bearing 106 and the retaining ring 108 on the clutch output hub 92. The torque transmission member 10 is directly supported on the clutch-side fixed bearing 106 in the axial direction 26. In the opposite axial direction 28, the torque transmission member 10 is, by contrast, directly supported on the clutch output hub 92, which, for this purpose—as evident from the FIGURE—preferably has a corresponding stage on which the support in the axial direction 28 can be effected. Due to the arrangement of the torque transmission member 10 adjacent to the clutch-side fixed bearing 106, an advantageous support of the forces—acting on the torque transmission member 10 via the external or helical toothing—on the housing 12 is already achieved, wherein the support of the said forces in torque transmission assembly 2 shown is again considerably improved by the further features of the torque transmission assembly 2 that are described below.

The clutch output hub 92 is substantially tubular, so that this has an opening 112 located on the inside in the radial direction 32, which opening is preferably continuous in the axial direction 26, 28. The opening 112 serves to receive the output shaft 50 of the spur gear 6, which extends in the axial direction 26 into the said opening 112, in order to be arranged substantially coaxially with the tubular clutch output hub 92, wherein the output shaft 50 extends so far in axial direction 26 into the opening 112 that this is also arranged nested with the clutch-side fixed bearing 106 and the torque transmission member 10, and the rotary feed-through described in more detail later on. The clutch output hub 92 and the output shaft 50 are supported against one another via at least one radial bearing 114, 116 within the opening 112.

In the embodiment illustrated, a first radial bearing 114 and a second radial bearing 116 are advantageously arranged between the output shaft 50 and the side of the clutch output hub 92 pointing inward in the radial direction 32, which are spaced apart from one another in the axial direction 26, 28 or/and are formed by rolling bearings, preferably needle roller bearings. The first radial bearing 114 is positioned in the axial direction 26, 28 such that it is arranged nested with the clutch-side fixed bearing 106 in the radial direction 30, 32. Thus, the clutch-side fixed bearing 106 in the embodiment illustrated is even arranged fully nested with the first radial bearing 114 in the radial direction 30, 32. The first radial bearing 114 is also arranged such it is also arranged at least partially nested with the torque transmission member 10 in the radial direction 30, 32, as is evident from the FIGURE, in which the first radial bearing 114 and the torque transmission member 10 are arranged overlapping one another in at least one axial region.

The second radial bearing 116 is, by contrast, arranged in the axial direction 28 spaced apart from the first radial bearing 114 between the output shaft 50 and the side of the clutch output hub 92 pointing inward in the radial direction 32.

Due to the two radial bearings 114, 116 in connection with the clutch-side fixed bearing 106 and the transmission-side fixed bearing 104, the radial and axial forces introduced via the torque transmission member 10 and via the output gears 62, 64 can be supported particularly reliably within the torque transmission assembly 2, without the output gears 62, 64, the torque transmission member 10, the clutch output hub 92 and the output shaft 50 performing undesirable movements, such as for example a wobble, thereby creating a particularly robust and also compact torque transmission assembly 2 with very smooth running and little wear. The aforementioned transmission-side fixed bearing 104 ensures that the output shaft 50 is supported in the axial directions 26, 28 on the housing 12, to be more precise the housing portion 16 of the housing 12. The robust design of the torque transmission assembly 2 to prevent undesirable movements is further supported by the fact that the first stage 54, the second stage 56, the dual clutch 8 and the torque transmission member 10 are arranged in the axial direction 26, 28 between the clutch-side fixed bearing 106 and the transmission-side fixed bearing 104.

As already indicated above, the dual clutch 8 is a wet-running and hydraulically actuatable dual clutch 8. To ensure the supply of such a dual clutch 8 with a cooling or/and lubricating fluid and a hydraulic fluid, the rotary feedthrough 118 indicated above is formed between a fixed housing portion of the housing 12, here the housing portion 20, and the clutch output hub 92. Specifically, the rotary feedthrough 118 is formed in the radial direction 30, 32 between the side of the opening in the housing portion 20 pointing radially inward in the radial direction 32 and a side of the clutch output hub 92 pointing outward in the radial direction 30. In principle, only the supply of hydraulic fluid to actuate the dual clutch 8 or only the supply of cooling or/and lubricating fluid to the dual clutch 8 ca be effected via the said rotary feedthrough 118, wherein both options are described together below by way of example with reference to the FIGURE. Thus, at least one hydraulic fluid line not shown in detail is formed in the housing portion 20, which line is fluidically connected via the rotary feedthrough 118 with at least one hydraulic fluid line that is formed within the tubular clutch output hub 92. Moreover, at least one cooling or/and lubricating fluid line is formed in the housing portion 20, which line is fluidically connected via the rotary feedthrough 118 with at least one cooling or/and lubricating fluid line within the tubular clutch output hub 92.

As evident from the FIGURE, the rotary feedthrough 118 and the housing portion 20 are advantageously arranged in the axial direction 26, 28 between the components—to be supplied with cooling or/and lubricating fluid and hydraulic fluid—of the dual clutch 8 on one side and the torque transmission member 10 on the other side. Moreover, the aforementioned second radial bearing 116 is arranged nested with the rotary feedthrough 118 and the housing portion 20 to support the clutch output hub 92 and the output shaft 50 against each other in the radial direction. As a result, a wobbling of the clutch output hub 92 in the axial region of the rotary feedthrough 118 is prevented particularly effectively so that a leakage in the region of the rotary feedthrough 118 can be countered particularly effectively.

LIST OF REFERENCE NUMERALS

2 torque transmission assembly
4 drive unit
6 two-stage spur gear
8 dual clutch
10 output-side torque transmission member
12 fixed housing
14 housing portion
16 housing portion
18 housing portion
20 housing portion
22 housing portion
24 housing portion
26 axial direction
28 axial direction
30 radial direction
32 radial direction
34 circumferential direction
36 circumferential direction
38 stator
40 rotor
42 output drive shaft
44 rotation axis
46 input shaft
48 rotation axis
50 output shaft
52 rotation axis
54 first stage
56 second stage
58 input gear
60 input gear
62 first output gear
64 second output gear
66 external gearing
68 external gearing
70 bearing
72 gearing
74 wheel hub
76 radial portion
78 first clutch
80 second clutch
82 multi-disk pack
84 multi-disk pack
86 first input side/outer disk carrier
88 second input side/inner disk carrier
90 output side
92 clutch output hub
94 multi-disk carrier
96 multi-disk carrier portion
98 toothing
100 common retaining ring
102 axial bearing
104 transmission-side fixed bearing
106 clutch-side fixed bearing
108 retaining ring
110 spline
112 opening
114 first radial bearing
116 second radial bearing
118 rotary feedthrough

The invention claimed is:

1. A torque transmission assembly for a motor vehicle, the torque transmission assembly comprising:

a two-stage spur gear having an input shaft for introducing the torque of a drive unit and an output shaft arranged parallel to the input shaft, and a dual clutch following the spur gear in the torque flow for selectively transmitting the torque from a first and second stage of the spur gear to an output-side torque transmission member of the torque transmission assembly, wherein the dual clutch has a clutch output hub on which the output-side torque transmission member is arranged in a rotationally fixed manner, and wherein the clutch output hub and the output shaft are supported against one another via at least one radial bearing.

2. The torque transmission assembly as claimed in claim 1, wherein the output-side torque transmission member is supported on the clutch output hub in an axial direction.

3. The torque transmission assembly as claimed in claim 1 herein at least one of:

the output-side torque transmission member is plugged onto the clutch output hub in an axial direction, the output-side torque transmission member is arranged with a form-fit on the clutch output hub in a rotationally fixed manner, the output-side torque transmission member is formed by a gear, and the output-side torque transmission member is arranged at least partially nested with the at least one radial bearing in the radial direction.

4. The torque transmission assembly as claimed in claim 1, wherein the dual clutch is at least one of a wet-running and a hydraulically actuatable dual clutch.

5. The torque transmission assembly as claimed in claim 4, wherein between a fixed housing portion and the clutch output hub there is a rotary feedthrough via which the dual clutch can be supplied with at least one of a cooling fluid, a lubricating fluid, and a hydraulic fluid.

6. The torque transmission assembly as claimed in claim 5, wherein the rotary feedthrough is arranged nested with the at least one radial bearing in a radial direction.

7. The torque transmission assembly as claimed in claim 5, wherein at least one of the rotary feedthrough and the housing portion is arranged in an axial direction between the output-side torque transmission member and components of the dual clutch to be supplied with the at least one of a cooling fluid, a lubricating fluid, and a hydraulic fluid.

8. The torque transmission assembly as claimed in claim 1, wherein the first stage has a first output gear which is rotatably mounted on the output shaft and which is connected to a first input side of a first clutch of the dual clutch in a rotationally fixed manner, and the second stage has a second output gear which is arranged rotationally fixed on or to the output shaft and which is connected via the output shaft to a second input side of a second clutch of the dual clutch in a rotationally driving manner.

9. The torque transmission assembly as claimed in claim 8, wherein at least one of:

the first input side is connected to the first output gear in a rotationally fixed manner spaced apart from a wheel hub of the first output gear in the radial direction, and the second input side is connected to the output shaft in a rotationally driving manner.

10. The torque transmission assembly as claimed in claim 9, wherein a wheel hub of the first output gear is tubular and extends substantially in an axial direction.

11. The torque transmission assembly as claimed in claim 9, wherein the second input side, the first output gear and the second output gear are supported on the output shaft in an axial direction via a common retaining ring, on the output shaft, or on a housing in the opposite axial direction via a transmission-side fixed bearing.

12. The torque transmission assembly as claimed in claim 10, wherein the first output gear further has a radial portion extending substantially in the radial direction and to which the first input side is connected in a rotationally fixed manner and on which an external toothing or helical toothing is provided.

13. The torque transmission assembly as claimed in claim 8, wherein the first clutch is a radially outer multi-disk clutch with the first input side in the form of an outer disk carrier, and wherein the second clutch is a radially inner multi-disk clutch with the second input side in the form of an inner disk carrier.

14. The torque transmission assembly as claimed in claim 13, wherein the second clutch is a radially inner multi-disk clutch with the second input side in the form of a multi-disk carrier connected to the clutch output hub in a rotationally fixed manner to form the output side of the outer and inner multi-disk clutch.

15. The torque transmission assembly as claimed in claim 1, wherein the dual clutch is at least one of a concentric dual clutch and multi-disk dual clutch.

16. The torque transmission assembly as claimed in claim 1, further comprising a drive unit with an output drive shaft which is connected to the input shaft in a rotationally driving manner.

17. The torque transmission assembly as claimed in claim 16, wherein the output drive shaft is formed as a single piece with the input shaft and the drive unit is formed by an electric machine including a rotor connected to the output drive shaft in a rotationally fixed manner.

18. The torque transmission assembly as claimed in claim 1 further comprising a fixed housing, wherein the clutch output hub is supported on the fixed housing via a clutch-side fixed bearing, and wherein the output-side torque transmission member is supported on the clutch output hub in an axial direction via the clutch-side fixed bearing.

19. The torque transmission assembly as claimed in claim 18 further comprising a transmission-side fixed bearing via which the output shaft is supported on the housing.

20. The torque transmission assembly as claimed in claim 19, wherein the first stage, the second stage, the dual clutch, and the output-side torque transmission member are arranged in the axial direction between the clutch-side fixed bearing and the transmission-side fixed bearing.

21. The torque transmission assembly as claimed in claim 18, wherein the clutch-side fixed bearing is arranged nested with the at least one radial bearing in the radial direction.

22. The torque transmission assembly as claimed in claim 18, wherein the output-side torque transmission member is supported on a retaining ring for supporting the clutch-side fixed bearing on the clutch output hub.

23. The torque transmission assembly as claimed in claim 1, wherein the clutch output hub has an opening which is continuous in an axial direction for receiving the output shaft in which the at least one radial bearing is arranged.

* * * * *